July 14, 1959    A. B. SOWTER ET AL    2,894,323
PRESSURE WELDING

Filed Feb. 20, 1953    2 Sheets-Sheet 1

INVENTORS
HENRY JAMES FOXON and
ANTHONY BAGNOLD SOWTER
BY
Pennie, Edmonds, Morton, Barrows & Taylor
ATTORNEYS

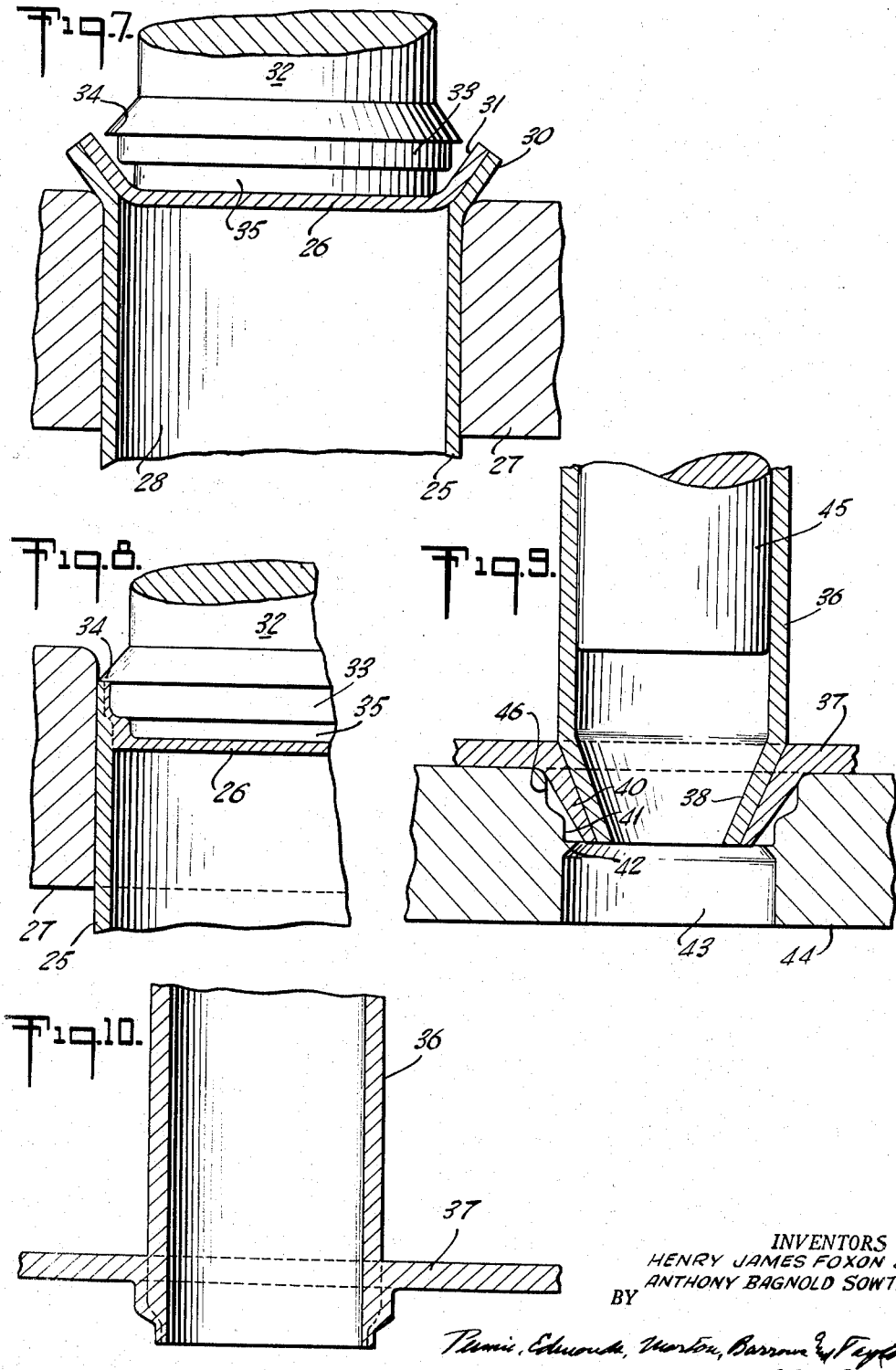

United States Patent Office 2,894,323
Patented July 14, 1959

2,894,323

PRESSURE WELDING

Anthony Bagnold Sowter, Ickenham, and Henry James Foxon, North Wembley, England, assignors to The General Electric Company Limited, London, England Application February 20, 1953, Serial No. 338,098

9 Claims. (Cl. 29—481)

The present invention relates to pressure welding and more particularly, but not exclusively, to cold pressure welding.

It is already known to join a pair of metal members, such as sheets, plates etc. capable of being cold pressure welded by a lap joint, by applying pressure to the superposed members substantially at right angle to the interface or weld area through the aid of suitably shaped impression tools or dies. As a result of the applied pressure, metal is cause to flow outwardly from under the pressure applying die surfaces or weld area, thereby causing a merging or intimate union of the adjoining metals equivalent to a solid phase welding bond at that area. Impression or indentation pressure welds of this type may be successfully produced by means of either a single die cooperating with a flat anvil (single-sided weld) or by a pair of twin-opposed dies (double-sided weld).

In a method of the above character, the metal flow or displacement along the interface or weld area conducive to welding is caused directly by the welding pressure applied substantially at right angle to the weld area or interface between the members being welded.

Furthermore, in indentation pressure welding of this type, the metal flow varies within substantial limits at different points of the usual strip-like or rectangular weld area, being greater at the edges of the strip or longer sides of the rectangular weld area and being reduced towards the center on account of the greater impedance offered to the flow of the metal from the center towards the edges of the area. As a result, substantial welding pressure becomes necessary to insure a sufficient metal flow over the entire weld area conductive to efficient cold pressure welding, the pressure required being furthermore dependent upon the degree of hardness or ductility of the metals being welded. This, in turn, involves an appreciable amount of metal being displaced into the adjoining metal parts, resulting, in turn, in a substantial deformation or distortion of the parts or members being welded at and adjacent to the weld spot or area.

Among the objects of the present invention is the provision of an improved method of and means for joining a pair of pressure weldable metal members by a lap joint which substantially overcomes the aforementioned and related difficulties and shortcomings; which will afford a more uniform metal flow and, in turn, a more efficient weld over the entire weld area; wherein the metal displaced on welding is readily removed or parted off to reduce distortion; and which can be carried out easily and reliably while involving a minimum of rejects or defective welds.

With the aforementioned objects in view, the invention involves generally the provision of means for and an improved method of welding a pair of pressure weldable metal members which comprises essentially positioning those portions of the members to be welded between a pair of facing tool surfaces, at least one of which has a strip-like welding surface, and causing relative movement of the tool surfaces in a direction generally parallel thereto, to bring the surfaces opposite one another and separated by a gap whose width, relative to the gauge thickness of the members, is such as to give the correct percentage reduction for pressure welding, and whose effective length, in the direction of relative movement, is of the order of the combined gauge thickness of the members. The relative movement between the tool surfaces causes a metal flow along the interface by extrusion of material from between the tool surfaces to effect welding. One of the tool surfaces is preferably provided at one edge with a projection which engages or so closely approaches the other surface when the surfaces are directly opposite one another, in the final welding position of the tools, that it acts as a cutting edge to shear off extruded or displaced excess metal.

The invention is especially suitable for lap joining by cold pressure welding the end portions of a pair of overlapping plates, strips, sheets or similar metal parts, arranged with their edges in register with one another and with the parts extending in the same direction, to thereby enable a ready outward metal flow by extrusion conductive to efficient and reliable pressure welding.

Thus, besides many other applications, the invention has special advantages in attaching a cover to a hollow cylindrical member such as welding a lid to a can by cold pressure welding. According to a known method of the latter type, described in U.S. Patent 2,608,887, issued September 2, 1952, to Anthony B. Sowter, co-applicant of the present application, the edge of a can of aluminum or other cold weldable metal is flared outwardly to provide a flat flange of small radial width. A lid having a surface which fits on the flange is placed on top of the can, and the lid is welded to the flange by suitable cold pressure welding tools which make a ring weld. The surfaces to be welded together are previously cleaned, preferably by scratch brushing with a rotary steel wire brush, to remove the oxide film and other surface contamination and to provide clean metal surfaces at the interface to be welded. If the projecting weld is undesirable, this can be dressed down by forcing the whole can top downwards through a die, the weld flange then lying close up against the side of the can.

When the above welding method is applied to cans of other than circular section, such as to oval section cans, although welding can be carried out just as successfully, some difficulty is experienced in obtaining satisfactory dressing-down of the weld so as to leave no sideways projection. Unless special precautions are taken the can lid tends to buckle, the weld folds down badly and, on occasion, the welded joint is fractured. This applies also to circular section cans, if the ring-shaped weld is not uniform throughout or concentric with the can or welding flange.

Another object of the present invention is, therefore, the provision of a cold pressure welding method which is particularly suited to welding can lids, leaving no projecting flange and thereby doing away with the need for dressing down a flange.

As an example, in the welding of a lid to a can, the can may be set in a die and a punch or plunger having a suitable welding surface and a trimming projection cooperates with the die to weld the lid to the top of the can. In other cases, for example when welding a tube into a plate, the die may be provided with the welding surface and projection (which acts as the cutting edge) and a smooth punch or plunger fits inside the tube and acts as the cooperating welding tool. In welding a lid to a can, since the relative movement between the tool surfaces is parallel to the can axis, the weld of the lid to the can top lies within the peripheral dimensions of the can and no subsequent dressing-over operation is required. This is particularly advantageous in the case of oval section cans.

The invention will be better understood from the following detailed description taken in conjunction with the accompanying drawings, forming part of this specification and wherein Fig. 1 shows schematically a simple tool setup for welding the end portions of a pair of metal plates or similar members by extrusion welding according to the invention, the parts being shown in position prior to welding;

Fig. 7 shows, partly in section, a tool setup for welding a lid to a can in accordance with the invention, the parts being shown prior to welding;

Fig. 8 shows the parts of Fig. 7 at the end of the welding operation, with the can and lid being pushed through and ejected from the tool;

Fig. 9 shows, partly in section, a tool setup for welding a tube into a plate by extrusion pressure welding according to the invention; and Fig. 10 shows the plate-to-tube weld obtained by means of the tool shown in Fig. 9.

Like reference characters identify like parts in the different views of the drawings.

Figure 1:
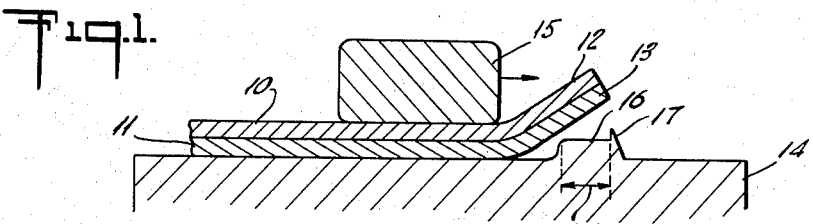

Referring to Fig. 1, there is shown a pair of sheets or plates 10 and 11 of copper, aluminum or any other pressure weldable metal superimposed upon one another with the end portions 12 and 13 flared or bent at an angle and positioned between a pair of welding dies 14 and 15 prior to welding. The edges of the superposed end portions 12 and 13 are substantially in register, i.e. lie in a common plane. The contacting surfaces of the end portions 12 and 13 should be cleaned previously, preferably by mechanical scratch brush treatment, to remove any oxide film and other matter foreign to the metal and to provide clean metal surfaces, in a manner well known in the art of cold pressure welding. While such cleaning will be necessary in most practical cases to remove surface oxide ordinarily formed upon aluminum and other cold weldable metals, cleaning may in certain cases be dispensed with where the surface film is such as to be broken up or disintegrated under the effect of the welding pressure, to enable merging of the metals and forming of a welding bond, without special treatment of the surface.

In the arrangement of Fig. 1, the tool 14 is in the form of an anvil having a raised welding portion or rib 16 to provide a strip-like horizontal welding surface having a width of the order of the combined gauge thickness of the plates or other members being welded. The height of the rib 16 is such as to give the proper percentage reduction at the weld, being from about 50% to 70% of the total thickness of the members being welded in the case of aluminum and varying for other metals in accordance with their relative Figure of Merit as given in U.S. Patent 2,522,408. The cooperating welding tool 15 has a flat or smooth horizontal tool surface virtually spaced from the anvil portion of the tool 14 by a distance equal to the combined gauge thickness of the plates 10 and 11.

Figure 2:
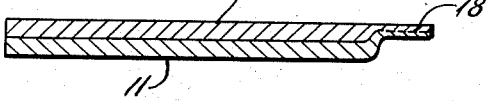
Fig. 2 shows the members of Fig. 1 after welding.

The tool members 14 and 15 are arranged for relative movement in a direction parallel to the plane of their welding surfaces or generally in the direction of the interface of the members being welded, as indicated by the arrow in Fig. 1, the tools being shown in this figure in the open position for insertion of the members to be welded. In order to effect welding, the tool 15 and welding rib 16 are moved toward one another by a suitable pressure applying means, thereby causing the angular end portions 12 and 13 to be progressively unbent or rolled back and extruded outwardly, to effect welding as a result of the metal flow along the interface, as indicated by the dotted line in Fig. 2, which shows the completed weld. At the same time, the projection 17, acting as a cutting edge and being of such height as to engage the surface of the tool 15 at the end position or the completion of the welding process, causes a parting or shearing off of the displaced or extruded excess metal. This greatly minimizes distortion of the members, compared with the previously known pressure welding methods. The welding pressure is controlled to produce the contemplated reduction in the combined thickness of the superposed end portions 12 and 13 by extrusion of metal outwardly toward the edges of the end portions.

Figure 3:
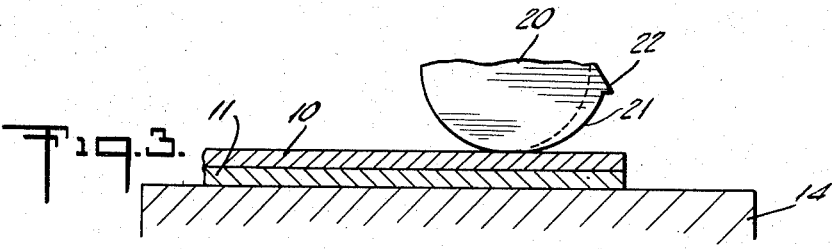
Figs. 3 and 4 show a modified tool setup of this type and the weld obtained thereby, respectively.
Figure 4:
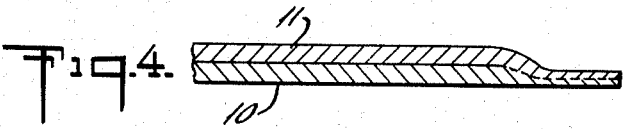

Figs. 3 and 4 illustrate a modified tool arrangement utilizing a welding roller 20 in cooperation with a flat anvil 14. The welding surface of the roller is in the form of a cam 21 terminating in a cutting edge 22 on the outside of the roller. An advantage of this arrangement is that no pre-bending or deformation of the members 10 and 11 is required prior to welding. The configuration of the cam 21 is such as to give the proper percentage reduction of the total work thickness at the weld, while the projection 22 serves to produce a clean shearing off of the extruded excess metal. In welding, the roller 20 is turned about an eccentric axis so that the cam 21 applies to the suitably cleaned and contacting end portions of the members 10 and 11 a sufficient pressure to effect a solid phase welding bond by extrusion of metal outwardly toward the edges of the end portions. Fig. 4 shows the finished weld.

Figure 5:
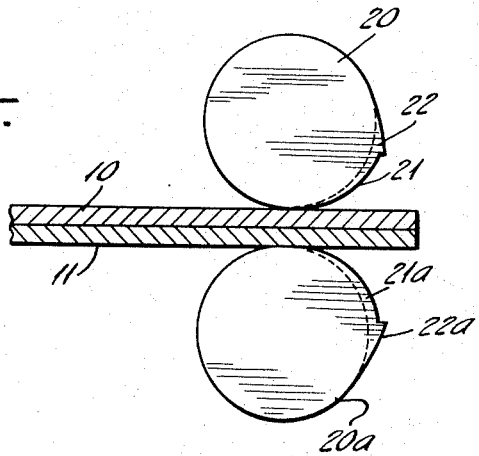
Figs. 5 and 6 show still another modification of an extrusion welding tool and the weld obtained thereby, respectively.
Figure 6:
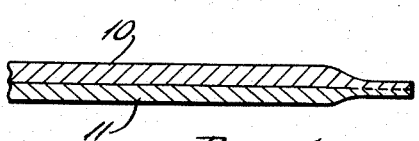

Referring to Figs. 5 and 6, there is shown a further modification utilizing a pair of twin-opposed welding rollers 20 and 20a having cam-shaped welding surfaces 21 and 21a and cutting edges 22 and 22a, respectively, designed in such a manner as to result in a proper total percentage reduction or welding impression upon the opposite sides of the members 10 and 11. The welding pressure is attained by turning the rollers 20 and 20a in opposite directions about their eccentric axis. The finished weld is shown in Fig. 6.

In effecting extrusion pressure welds of the type aforedescribed, an average practical value of the width $w$ of the strip-like welding surface or weld area has been found to be about twice the gauge thickness or equal to the total thickness of the members 10 and 11, although the width may deviate to a certain extent in either direction in obtaining satisfactory and reliable welds.

Referring now to Fig. 7, the can 25 and lid 26 are both of pressure weldable metal, such as commercial purity aluminum, the can being of circular or any other section having a closed bottom made by impact extrusion or by any other process. The bottom tool or die 27 has a hole 28 into which the can 25 fits fairly snugly. The tool 27 consists of tool steel and may be supported on the platen of a press, such as a hydraulic press or the like, the platen having a central hole beneath the hole 28 in the die 27 so that the can can be ejected below the die upon welding of the lid 26. The top or mouth of the can 25 is flared outwardly to provide a frusto-conical seating 30 for the lid 26 and the lid 26 is pressed out from sheet in the form of a shallow cup having a frusto-conical rim 31 which fits on the seating 30. The contacting surfaces of the seating 30 and the rim 31 must, of course, be clean and these surfaces may be cleaned by a rotary steel wire scratch brush in known manner. The mouth of the hole 28 is slightly rounded.

The cooperating top tool or plunger 32 is also mounted in the press so that it moves rectilinearly and coaxially with the hole 28 in the lower tool or die 27. To facilitate its manufacture, the tool 32 may be built up from separate parts bolted together or it may be one integral piece. Essentially, it comprises a cylindrical welding surface 33 and a projection or cutting edge 34. The welding surface 33 is of cylindrical strip-like form and cooperates with the inside surface of the hole 28 in the die 27, which inside surface provides the other welding surface. The cutting edge 34 is of such diameter that it fits closely in the hole 28 when the plunger 32 is moved down fully into the die 27. The shoulder forming the cutting edge 34 may have a taper of about 60° on its upper side, its underside being perpendicular to the axis of the plunger 32 to give a flat top to the weld between the can 25 and the lid 26. However, it is not essential that the underside of the shoulder should be perpendicular to the plunger axis; it may be inclined at any suitable angle provided a sharp top edge to the weld is not objectionable.

The axial depth or width of the welding surface 33 on the plunger 32 is of the order of the combined gauge thickness of the can 25 and lid 26. Actually, in the arrangement shown, the can 25 and the lid 26 are of the same gauge and, in this case, the axial depth of the surface 33 is twice the gauge thickness. The diameter of the welding surface 33 is such that the width of the gap left between that surface and the inside welding surface of the hole 28 in the die 27 gives the correct percentage reduction for cold pressure welding, the final thickness at the weld being about 30% of the combined thickness of the seating 30 and the rim 31. The lower edge of the welding surface 33 is slightly rounded to avoid abrupt changes of shape in the finished weld.

Below the welding surface 33 is a further cylindrical surface 35 whose width or axial depth is about 66% of the combined gauge thickness of the seating 30 and rim 31 and whose diameter is such that the gap between it and the inside surface of the hole 28 in the die 27 is about equal to the combined thickness of the seating and rim. During the downward movement of the top tool, the bottom of the plunger 32 engages directly on top of the lid 26. The surface 35 and the bottom of the plunger 32 maintain the correct and required shape of the lid, and the surface 35 traps metal between itself and the hole 28 so that the metal during the downward movement of the tip tool is forced upwardly past the edge 34, whilst the edge 34 is still clear of the hole 28. The top of the surface 35 is rounded into the shoulder formed below the welding surface 33 and the lower edge of the surface 35 is rounded into the bottom of the plunger so as to avoid abrupt changes of shape in the finished weld.

In operation, the can 25 with a cleaned seating 30 is set in the die 27 and a lid 26 with a cleaned rim 31 is placed on the can. The plunger 32 is then brought down under pressure onto the lid 26 so that the can 25 and lid 26 commence to move downwardly in the die 27, the seating 30 and rim 31 tending to move radially inwardly. Once the welding surface 33 moves down into the hole 28 in the die and beyond the slightly rounded mouth of the die, the metal of the seating 30 and rim 31 commences extruding upwardly and this progressively continues until the cutting edge 34 fully enters the die hole 28 and cuts off the extruded excess metal which is left as a floating ring around the neck of the plunger 32. The plunger 32 continues its downward movement and finally the can 25 with its welded lid 26 is ejected from the underside of the die 27. An excellent weld shape is obtained and the weld does not lie outside the periphery of the can 25, as shown in Fig. 8.

Fig. 9 shows a tool arrangement for welding a tube 36 into a plate 37. In this arrangement, the end of the tube is bent or spun inwardly with respect to its axis to provide a frusto-conical flange or end portion 38 closely fitting a similar depending frusto-conical flange or seat 40 spun or pressed out from the plate 37 and preferably having a downwardly tapering cross-section. A welding surface or projection 41 and shearing edge 42 are provided on the inside of the opening 43 of a lower die or tool 44. The cooperating upper welding tool in this arrangement is a smooth punch or plunger 45 closely fitting inside the tube 36. Adjoining the welding surface 41 is a further cylindrical surface 46 having a diameter greater than the outer diameter of the tube 36 to accommodate both flanges 38 and 40 as well as the metal upwardly extruded as welding progresses to the final welding position of the tools.

In operation, the members 36 and 37, after suitably cleaning the areas of contact of the flanges 38 and 40, are assembled in the die 44 in the manner shown in Fig. 9, whereupon the punch 45 is brought down with sufficient pressure to force the flanges 38 and 40 into a cylindrical shape, thus causing the metal to be displaced or extruded and to effect welding at the interface, in substantially the same manner hereinbefore described and as indicated by the dotted weld line in Fig. 10 which illustrates the finished weld.

While the invention has been described herein with specific reference to cold pressure welding, i.e. welding at room temperature or without the use of any appreciable amount of external heat, it will be understood that some heat may be applied to the members being welded provided, however, that welding is essentially effected as a result of the pressure-induced plastic flow of the metal, to effect merging or intimate welding at the interface in the manner described. The additional heat may be supplied by either heating the pressure welding tools, or the members to be welded may be heated either before or during welding.

In the foregoing the invention has been described by reference to a few illustrative tools and methods. It is to be understood, however, that variations and modifications of both the described tools and method steps, as well as the substitution of equivalent tools and steps, may be made without departing from the broad scope and spirit of the invention as set forth in the appended claims. The specification and drawings are accordingly to be regarded in an illustrative rather than in a limiting sense.

We claim:

1. In a method of welding a pair of cold pressure weldable metal members, arranged with the edges of the superposed end portions of said members substantially in register with one another and with the members extending in the same direction from said edges, comprising initially applying welding pressure to the contacting surfaces of said end portions at a line remote from and substantially parallel to said edges, and coinciding with the inner edge of a desired marginal welding area of said members, and progressively increasing and advancing the welding pressure across said area in the direction towards said edges, to produce a predetermined reducion in the total thickness of the contacting end portions over said area of at least fifty percent by extrusion of said end portions outwardly toward said edges, thereby to create an intense interfacial metal flow conducive to joining of said members in a solid phase welding bond at said area.

2. In a method according to claim 1, wherein the width of said weld area in the direction of the progressively advancing welding pressure is of the order of the total thickness of said end portions.

3. A method of welding a pair of cold pressure weldable metal members, arranged with the edges of the superposed end portions of said members in register with one another and with the members extending in the same direction from said edges, comprising providing clean metallic surfaces of the areas of said end portions to be joined, arranging the members with the cleaned areas in contacting relation, initially applying welding pressure to the contacting end portions at a line remote from and substantially parallel to said edges, and coinciding with the inner edge of a desired marginal welding area of said members, and progressively increasing and advancing the welding pressure across said area in the direction towards said edges, to reduce the thickness of the contacting end portions by at least fifty percent and to extrude said end portions outwardly towards said edges, thereby to create an intense interfacial metal flow conducive to joining of said members in a solid phase welding bond at said area.

4. A method of cold pressure welding a pair of aluminum members arranged with the superposed end portions of said members in register with one another and with the members extending in the same direction from said edges, comprising providing clean metallic surfaces of the areas of said end portions to be joined, arranging the members with the cleaned areas in contacting relation, initially applying welding pressure to the contacting end portions at a line remote from and substantially parallel to said edges, and coinciding with the inner edge of a marginal welding area having a width of the order of the total thickness of said members, and progressively increasing and advancing the welding pressure in the direction towards said edges, to extrude said end portions outwardly towards said edges and to reduce the thickness thereof by about fifty to seventy percent of said total thickness, thereby to create an intense interfacial metal flow conducive to joining of said members in a solid phase welding bond at said area.

5. A method of welding a pair of cold pressure weldable metal members, arranged with the superposed end portions of said members in register with one another and with the members extending in the same direction from said edges, comprising the steps of prebending said end portions to form angles with the planes of said members, providing clean metallic surfaces of the areas of the bent portions to be joined, arranging said members between a pair of pressure welding tools having tool faces spaced by a distance equal to the total thickness of said members and a welding area projecting from at least one of said tool faces, said end portions arranged with their edges in register and being in contacting engagement with one another, and displacing said tool faces relative to one another in a direction substantially parallel to the interface between said members, to initially apply welding pressure to said end portions at a line remote from and parallel to said edges, and coinciding with the inner edge of a marginal welding area of said members, said pressure increasing and advancing progressively towards said edges as the relative displacement of said tool faces is continued, whereby to unbend said end portions by said tool faces and to reduce the thickness of said end portions by extrusion outwardly towards said edges, to thereby create an intense interfacial metal flow at said area conducive to joining said members in a solid phase welding bond thereat.

6. A method of cold pressure welding, as claimed in claim 5 wherein said marginal area has a width approximately equal to the total thickness of said end portions and the metal reduction at said area is at least fifty percent of said width.

7. A method of welding a cover member to the edge of a hollow cylindrical member, both said members consisting of cold pressure weldable metal, comprising outwardly bending the end portions of said members to provide frusto-conical interfitting flanges, placing the interfitting members between a pair of concentric cylindrical tool faces conforming to said cylindrical member and spaced from one another by a distance of the order of the total thickness of said end portions, at least one of said tool faces having a projecting strip-like welding area of a height being at least fifty percent of said total thickness, and relatively axially displacing said tool faces to unbend and extrude said flanges outwardly toward the edges thereof, to reduce the thickness of said end portions at a marginal area equal to said welding area, thereby to create an intense interfacial metal flow conducive to joining of said members in a solid phase welding bond at said area.

8. A method of welding a cover to a hollow cylindrical member, both consisting of pressure weldable metal, comprising outwardly bending the end portions of both said container and cover, to provide interfitting frustoconical flanges, providing clean metallic areas of contact of said flanges to be joined, placing the interfitting container and cover between a pair of concentric tool faces conforming to said container and spaced from one another by a distance equal to the total thickness of said end portions, at least one of said tool faces having a projecting welding area of a width of the order of the total thickness of said end portions and a projecting height being at least fifty percent of said width, and relatively axially displacing said tool faces, to unbend and extrude said flanges outwardly towards said edges and to reduce the thickness thereof at a predetermined marginal area equal to said welding area, thereby to create an intense interfacial metal flow conducive to joining of said cover to said member by a solid phase welding bond at said area, and shearing off extruded excess metal exterior of said area.

9. A method of welding a hollow cylindrical member to an opening of a flat member, both said members consisting of pressure weldable metal, comprising inwardly bending the end portion of said cylindrical member and the end portion adjacent to said opening, to provide interfitting frusto-conical flanges, placing the interfitting members between a pair of concentric tool faces conforming to said cylindrical member and spaced from one another by a distance equal to the total thickness of said end portions, at least one of said tool faces having a projecting welding area having a width of the order of the total thickness of said members and a height being at least fifty percent of said width, and relatively axially displacing said tool faces, to unbend and extrude said flanges outwardly towards the edges thereof, to reduce the thickness of said end portions at a marginal area equal to said welding area, to thereby create an intense interfacial metal flow conducive to joining said cover to said member in a solid phase welding bond at said area.

References Cited in the file of this patent

UNITED STATES PATENTS

| | | |
|---|---|---|
| 357,980 | Coffin | Feb. 15, 1887 |
| 444,928 | Thomson | Jan. 20, 1891 |
| 1,249,532 | Smith et al. | Dec. 11, 1917 |
| 1,482,818 | Shipman | Feb. 5, 1924 |
| 1,483,027 | Wagner | Feb. 5, 1924 |
| 2,024,286 | Handler | Dec. 17, 1935 |
| 2,363,635 | Blair | Nov. 28, 1944 |
| 2,396,616 | Stather-Dunn | Mar. 12, 1946 |
| 2,427,597 | Garner et al. | Sept. 16, 1947 |
| 2,608,887 | Sowter | Sept. 2, 1952 |
| 2,639,633 | Sowter | May 26, 1953 |
| 2,691,815 | Boessenkool et al. | Oct. 19, 1954 |
| 2,691,816 | Siegel | Oct. 19, 1954 |
| 2,697,954 | Sowter | Dec. 28, 1954 |
| 2,701,483 | Foxon et al. | Feb. 8, 1955 |
| 2,707,821 | Sowter | May 10, 1955 |
| 2,707,826 | Sowter | May 10, 1955 |
| 2,707,889 | Sowter | May 10, 1955 |